June 21, 1927.
A. F. SANFORD
1,632,923
MECHANISM FOR CONVERTING MOTION
Filed March 11 1925    2 Sheets-Sheet 1
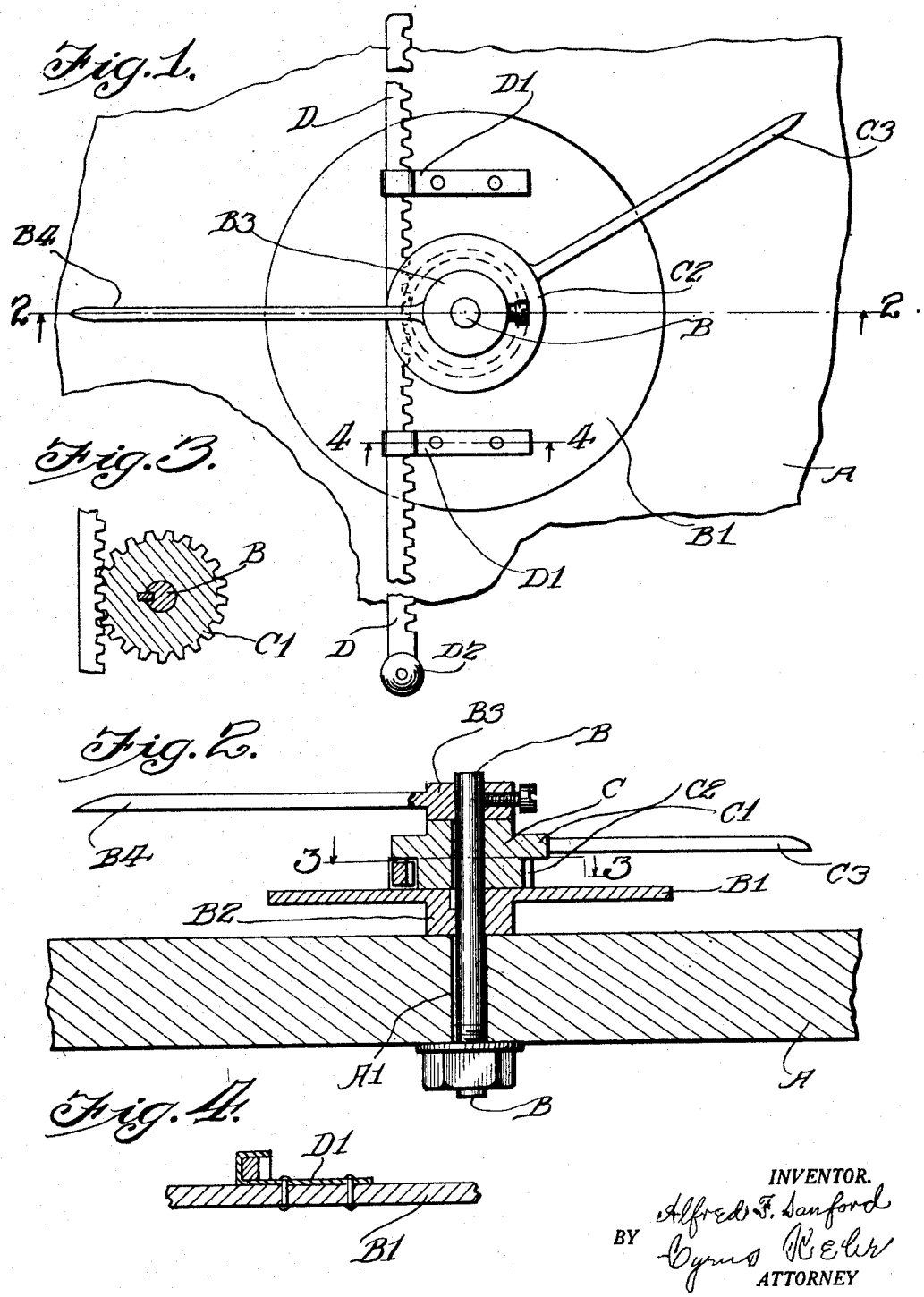
INVENTOR.
Alfred F. Sanford
BY Cyrus Kehr
ATTORNEY

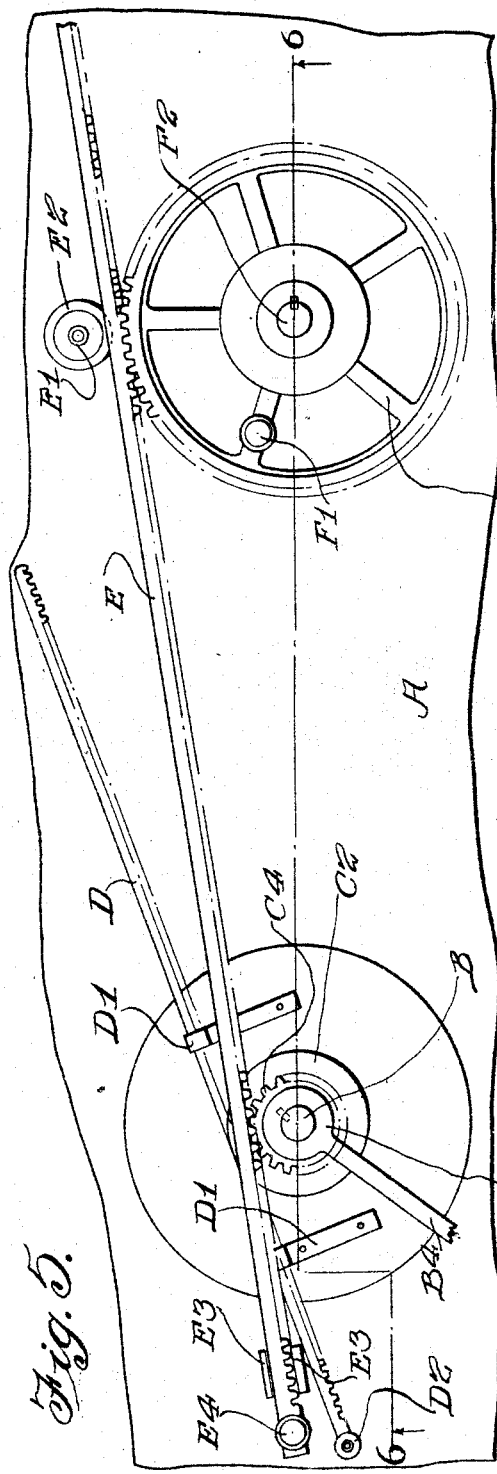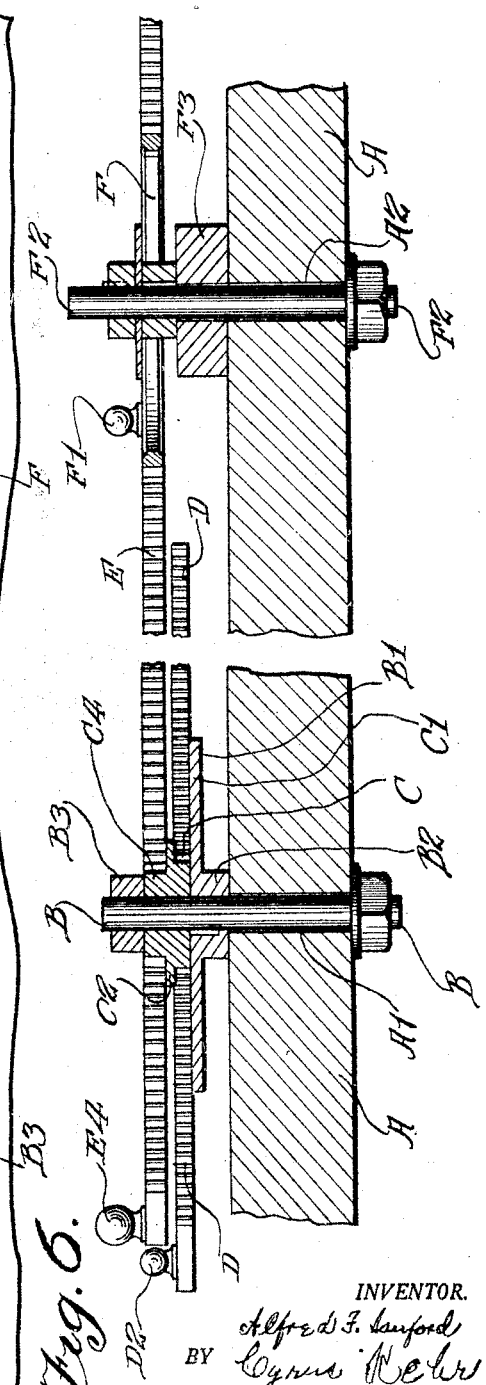

Patented June 21, 1927.

1,632,923

UNITED STATES PATENT OFFICE.

ALFRED F. SANFORD, OF KNOXVILLE, TENNESSEE.

MECHANISM FOR CONVERTING MOTION.

Application filed March 11, 1925. Serial No. 14,791.

My improvement relates particularly to mechanism comprising a group of mechanical members placed in operative relation with each other to permit moving a portion of those members to transmit motion to others of said members, the movements being varied by varying or changing the application of force for movement from one of said members to the other.

In the accompanying drawings,

Fig. 1 is a plan of an apparatus embodying my improvement;

Fig. 2 is an upright section on the line, 2—2, of Fig. 1, looking in the direction of the arrows;

Fig. 3 is a horizontal section on the line, 3—3, of Fig. 2;

Fig. 4 is an upright section on the line, 4—4, of Fig. 1;

Fig. 5 is a plan similar to Fig. 1, with the addition of a rack bar and a gear wheel and other members;

Fig. 6 is an upright section on the line, 6—6, of Fig. 5.

Referring first to Figs. 1, 2, 3 and 4, A is a stationary or relatively stationary base. B is an upright shaft seated rotatably in the bearing, $A^1$, formed in the base, A. Above the base, A, a disc or turntable, $B^1$, surrounds and is keyed to the shaft, B, the hub, $B^2$, of said disc or turntable resting on the upper face of the base, A. Above the turntable and resting loosely thereon, a pinion body, C, loosely surrounds the shaft, B. The lower part of the body, C, has radial teeth forming a pinion, $C^1$. Above that pinion is a horizontal annular flange, $C^2$, extending outward beyond the teeth of the pinion. A horizontal arm, $C^3$, is rigid on the flange, $C^2$, and is of any desired length. Above the body, C, a hub, $B^3$, surrounds and is fixed to the shaft, B. A horizontal arm, $B^4$, is supported by the hub, $B^3$, and may be of any desired length.

A rack bar, D, is placed horizontally above the turntable, $B^1$, in mesh with the pinion, $C^1$, and rests on guide members, $D^1$, which are fixed to the upper face of the turntable and extend over the back and upper face of the rack bar, whereby endwise reciprocation of the rack bar is permitted without turning the turntable, but such reciprocation turning the body, C, and the arm, $C^3$. This arrangement also permits giving the rack bar a rocking movement in a horizontal plane, whereby the turntable and the shaft, B, and the arm, $B^1$, are partially turned, the shaft, B, serving as a fulcrum for this rocking movement. If, during this rocking movement, the rack bar is held against sliding endwise on the turntable, the body, C, and the arm, $C^3$, will also be partially turned in unison with the turntable—as though said body were fixed on the turntable or on the shaft, B. But during such rocking movement, the rack bar may be made to slide endwise in the proper direction and at the proper velocity to allow the body, C, and the arm, $C^3$, to remain stationary while the shaft, B, and the turntable and the arm, $B^4$, undergo a partial turning movement. Furthermore, during the rocking movement of the rack bar, the rack bar may be given a slower movement than is needed to keep the body, C, and the arm, $C^3$, stationary, whereby said body and said arm undergo a relatively slow turning movement during the rocking of the rack bar; or the rack bar may be given a faster endwise movement than is required to keep the body, C, and the arm, $C^3$, stationary, said body and said arm thus undergoing a correspondingly fast partial turning movement.

Thus the rack bar and the arms, $B^4$ and $C^3$, may be given a varied positioning by using the rack bar as the prime mover or the member to which power is applied for its two movements, the endwise movement and the rocking movement.

If power is applied to the arm, $B^4$, to move it horizontally, the shaft, B, and the turntable, $B^1$, will be correspondingly turned, the axis of movement being the axial line of the shaft, B. Thus turning the turntable will move the rack bar in a horizontal plane, the movement being a tilting movement of which the axis is the axis of the shaft, B. If during such movement the rack bar is held against endwise movement, the body, C, and the arm, $C^3$, are compelled to move or turn in unison with the turntable, $B^1$, as though the body, C, were fixed to the turntable. But, if during such turning of the arm, $B^4$, the rack bar is allowed to move or made to move endwise at the proper speed, the body, C, and the arm, $C^3$, may remain stationary; or if the rack bar is allowed to move or made to move endwise at some other speed, the body, C, and the arm, $C^3$, will be moved correspondingly.

If power is applied to the arm, $C^3$, for moving it horizontally and the turntable, B¹, is not allowed to turn, the rack bar will be moved endwise; but if the rack bar is held against endwise movement on the turntable, this movement of the arm, C³, will cause the turntable and the shaft, B, and the arm, B⁴, to turn in unison with the arm, C³, and the body, C. But if the rack bar is allowed to move endwise at a velocity other than the velocity needed for allowing the turntable to remain stationary, the turntable and the shaft B, and the arm, B⁴, will receive a corresponding movement.

From the foregoing, it will be seen that these several members, associated in the manner shown and described, may produce or be put through a large variety of relatively direct or single movements and a large variety of compound movements.

Referring now to Figs. 5 and 6, the parts already described are present, excepting that the arm, C³, is omitted and the part of the body, C, above the flange, C², is provided with radial gear teeth, C⁴, whereby that part of the body, C, is made a spur gear wheel.

On the base, A, is seated an upright shaft, F², like the shaft, B, and rotatable in the bearing, A², of the base. Above the base, the shaft is surrounded by a spacing block, F³, the lower face of which rests on the base, A. A spur gear wheel, F, surrounds and is keyed to the shaft, F². A gear rack, E, is placed horizontally to bring its teeth into engagement with the teeth of the wheel, F, and with the teeth, C⁴, of the body, C. Adjacent the spur gear wheel, F, is a guide wheel, E¹, having a lower flange, E². The body of said wheel bears against the back of the rack bar and said flange extends under said bar. By this means, the rack bar is held in engagement with the spur gear wheel, F. At its left hand end, the rack bar, E, extends between stationary guides, E³. These guides and the guide wheel, E¹, and the guide wheel, F, confine this rack bar to endwise reciprocation.

On the left hand end of the rack bar, E, is a handle, E⁴, which may be engaged by the hand for reciprocating said bar. On the spur gear wheel, F, is a handle, F¹, which may be engaged by the hand for turning said wheel in either direction.

Now comparison of Figs. 5 and 6 with the preceding figures will make it clear that rotation of the body, C, by means of the rack bar, D, or the arm, B⁴, will cause the endwise movement of the rack bar, E, whereby said rack bar compels the rotation of the spur gear wheel, F, the direction of that rotation depending upon the direction of movement of the rack bar, E, and that direction depending upon the direction of turning of the body, C, with the shaft, B. It will also be seen that if the handle, E⁴, is engaged and the rack bar, E, pushed endwise, the body, C, and the spur gear wheel, F, will be turned simultaneously by the rack bar, E. This turning of the body, C, will cause the endwise movement of the rack bar, D, in the guides, D¹, D¹.

The drawings show the spur gear wheel, F, of larger diameter than the spur gear parts of the body, C. Hence if the body, C, is rotated for transmission of motion through the rack bar, E, the wheel, F, will be turned at a velocity lower than the velocity of the body, C. Conversely, if the spur gear wheel, F, is turned for reciprocating the rack bar, E, the body, C, will be rotated at a velocity higher than the velocity of the wheel, F. Furthermore, if power is applied to the rack bar, E, to make it serve as the prime mover, the body, C, and the wheel, F, are rotated simultaneously, the rotation of the wheel, F, being at a lower velocity than the velocity of the body, C.

It will also be seen that any desired member may be attached to the upper end of the shaft, F², to receive movement in a horizontal plane from said shaft simultaneously with the rotation of the wheel, F, said wheel being keyed to said shaft.

It will also be seen that the rack bar, D, may be turned in its horizontal plane simultaneously with its endwise movement for turning the body, C, whereby the rack bar, E, is made to move endwise simultaneously with the endwise and lateral movement of the rack bar, D, whereby the wheel, F, and the axle, F², are made to turn simultaneously with the endwise and lateral movement of the rack bar, D.

Furthermore, the wheel, F, may be turned for moving the rack bar, E, for turning the body, C, for moving the rack bar, D, endwise, and at the same time the arm, B⁴, may be moved laterally for turning the turntable to move the rack bar, D, laterally in its horizontal plane. Instead of engaging the arm, B⁴, for this movement of the turntable, the handle, D², of the rack bar, D, may be engaged and moved sidewise for turning the turntable. This lateral movement of the rack bar, D, while it is moving endwise will cause the free end of said rack bar to move on a curved line, the form of said curved line depending upon the relative velocities of the two movements imparted to the rack bar, D.

Now it will be seen that the larger combination of elements shown by Figs 5 and 6 permits all the movements of the combination of elements of Figs. 1, 2, 3 and 4, with a considerable addition to those movements.

In either form of the mechanism, chosen members may be used as prime movers to put one or more other members into desired positions. It will be understood that any member adapted to indicate position and to be grasped for turning the shaft, B, and the turntable, B¹, and swinging the rack bar, D, may be substituted for the arm, B⁴. It will also be understood that the turntable may be of any form adapted to support the rack bar, D, for endwise sliding in a plane to which the turntable axis is transverse.

I claim as my invention:

1. In a mechanism of the kind described, the combination of a rotatable shaft, a turntable fixed on said shaft, a member loosely surrounding said shaft and having radial gear teeth, and a rack bar supported on the turntable in engagement with said gear teeth and confined for endwise movement on the turntable, substantially as described.

2. In a mechanism of the kind described, the combination of a rotatable shaft, a turntable fixed on said shaft, a member loosely surrounding said shaft and having radial gear teeth, a rack bar supported on the turntable in engagement with said gear teeth and confined for endwise movement on the turntable, and another member on the axial line of the turntable and rotatable in unison with the turntable, substantially as described.

3. In a mechanism of the kind described, the combination of a rotatable shaft, a turntable fixed on said shaft, a member loosely surrounding said shaft and having radial gear teeth, a rack bar supported on the turntable in engagement with said gear teeth and confined for endwise movement on the turntable, and another member fixed on said shaft at the side of the loose member opposite the turntable, substantially as described.

4. In a mechanism of the kind described, the combination of a turntable, a member on the axial line of the turntable and rotatable independently of the turntable and having radial gear teeth, a rack bar supported by the turntable in engagement with said gear teeth and confined for endwise movement on the turntable and reaching beyond the edge of the turntable, a gear wheel mounted to permit rotation on an axis distinct from the turntable axis, and means connecting said gear wheel and said gear teeth bearing member for transmitting motion from said member to said gear wheel or from said gear wheel to said member, substantially as described.

5. In a mechanism of the kind described, the combination of a turntable, a member on the axial line of the turntable and rotatable independently of the turntable and having radial gear teeth, a rack bar supported by the turntable in engagement with said gear teeth and confined for endwise movement on the turntable, and another member on the axial line of the turntable and rotatable in unison with the turntable, a gear wheel mounted to permit rotation on an axis distinct from the turntable axis, and means connecting said gear wheel and said gear teeth bearing member for transmitting motion from said member to said gear wheel or from said gear wheel to said member, substantially as described.

6. In a mechanism of the kind described, the combination of a shaft, a turntable on said shaft, a member on the axial line of the turntable and rotatable independently of the turntable and having radial gear teeth, a rack bar supported by the turntable in engagement with said gear teeth and confined for endwise movement on the turntable, a gear wheel mounted to permit rotation on an axis distinct from the turntable axis, and means connecting said gear wheel and said gear teeth bearing member for transmitting motion from said member to said gear wheel or from said gear wheel to said member, substantially as described.

7. In a mechanism of the kind described, the combination of a shaft, a turntable on said shaft, a member on the axial line of the turntable and rotatable independently of the turntable and having radial gear teeth, a rack bar supported by the turntable in engagement with said gear teeth and confined for endwise movement on the turntable, and another member on the axial line of the turntable and rotatable in unison with the turntable, a gear wheel mounted to permit rotation on an axis distinct from the turntable axis, and means connecting said gear wheel and said gear teeth bearing member for transmitting motion from said member to said gear wheel or from said gear wheel to said member, substantially as described.

8. In a mechanism of the kind described, the combination of a turntable, a member on the axial line of the turntable and rotatable independently of the turntable and having radial gear teeth, a rack bar supported on the turntable in engagement with said gear teeth and confined for endwise movement on the turntable, a gear wheel mounted to permit rotation, and a rack bar connecting said gear wheel and said gear teeth bearing member for transmitting motion from said member to said gear wheel or from said gear wheel to said member, substantially as described.

9. In a mechanism of the kind described, the combination of a turntable, a member on the axial line of the turntable and rotatable independently of the turntable and having radial gear teeth, a rack bar supported on the turntable in engagement with said gear teeth and confined for endwise movement on the turntable, and another member on the axial line of the turntable and rotatable in unison with the turntable, a gear wheel mounted to permit rotation, and a rack bar connecting said gear wheel and said gear teeth bearing member for transmitting motion from said member to said gear wheel or from said gear wheel to said member, substantially as described.

10. In a mechanism of the kind described, the combination of a turntable, a member on the axial line of the turntable and rotatable independently of the turntable and having radial gear teeth, a rack bar supported by the turntable in engagement with said gear teeth and confined for endwise movement on the turntable and reaching beyond the edge of the turntable, a rotatable shaft on an axis distinct from the turntable axis, a gear wheel fixed on said shaft, and means connecting said gear wheel and said gear teeth bearing member for transmitting motion from said member to said gear wheel or from said gear wheel to said member, substantially as described.

11. In a mechanism of the kind described, the combination of a turntable, a member on the axial line of the turntable and rotatable independently of the turntable and having radial gear teeth, a rack bar supported by the turntable in engagement with said gear teeth and confined for endwise movement on the turntable and reaching beyond the edge of the turntable, and another member on the axial line of the turntable and rotatable in unison with the turntable, a rotatable shaft on an axis distinct from the turntable axis, a gear wheel fixed on said shaft, and means connecting said gear wheel and said gear teeth bearing member for transmitting motion from said member to said gear wheel or from said gear wheel to said member, substantially as described.

12. In a mechanism of the kind described, the combination of a shaft, a turntable on said shaft, a member on the axial line of the turntable and rotatable independently of the turntable and having radial gear teeth, a rack bar supported by the turntable in engagement with said gear teeth and confined for endwise movement on the turntable, a gear wheel mounted to permit rotation on an axis distinct from the turntable axis, and means connecting said gear wheel and said gear teeth bearing member for transmitting motion from said member to said gear wheel and from said gear wheel to said member, substantially as described.

In testimony whereof I have signed my name, this ninth day of March, in the year one thousand nine hundred and twenty-five.

ALFRED F. SANFORD.